United States Patent [19]

Takada

[11] Patent Number: 5,338,995

[45] Date of Patent: Aug. 16, 1994

[54] CASING STRUCTURE OF A MOTOR

[75] Inventor: Shigeru Takada, Toyama, Japan

[73] Assignee: Mitsuba Electric Manufacturing Co., Ltd., Kiryu, Japan

[21] Appl. No.: 17,184

[22] Filed: Feb. 12, 1993

[30] Foreign Application Priority Data

Feb. 14, 1992 [JP] Japan .................... 4-013842[U]

[51] Int. Cl.$^5$ .............................................. H02K 5/04
[52] U.S. Cl. ........................................ 310/89; 310/254
[58] Field of Search ................ 310/42, 89, 85, 91, 310/242, 245, 249, 71, 254

[56] References Cited

U.S. PATENT DOCUMENTS

| | | | |
|---|---|---|---|
| 2,514,693 | 7/1950 | Chapman | 310/238 |
| 3,946,260 | 3/1976 | Frezzolini et al. | 310/112 |
| 4,685,625 | 8/1987 | Mazza | 241/36 |
| 5,185,544 | 2/1993 | Takada | 310/58 |
| 5,191,250 | 3/1993 | Kobayashi | 310/261 |

*Primary Examiner*—Emanuel T. Voeltz
*Assistant Examiner*—D. R. Haszko
*Attorney, Agent, or Firm*—Oliff & Berridge

[57] ABSTRACT

A motor casing is formed in such a way that an outer peripheral surface of an edge portion of an opening of a yoke to which a permanent magnet is fixed is attached on an inner peripheral surface in a tubular peripheral edge portion of an intermediate bracket on which a brush holder is provided. The motor casing obviates the necessity for making the motor casing exceptionally large even when a radially long brush or an axially long permanent magnet is used.

12 Claims, 4 Drawing Sheets

CASING STRUCTURE OF A MOTOR

BACKGROUND OF THE INVENTION

Field of the Invention

The present invention relates to a casing structure of a motor mounted on electrical equipment for vehicles.

Description of the Related Art

Generally, motor casings of the above type are formed in such a way that a bracket, with which a brush holder which slidably contacts a commutator of an armature provided within a cylindrical yoke is provided integrally, is attached to an edge portion of an opening of the cylindrical yoke. The cylindrical yoke has a permanent magnet fixed onto the inner peripheral surface thereof. In casings of this type, the bracket must be attached to the yoke while taking axial positioning and waterproofing into consideration. As shown in FIGS. 8 and 9, when attaching the bracket to the yoke, the inner diameter of a bracket 20 is made smaller than that of a yoke 21. A socket engagement portion of the bracket 20, having a stepped difference and a small diameter on the outer peripheral portion of the bracket, is attached in such a manner as to be placed on the inner peripheral portion of the edge portion of the opening of the yoke. The bracket is positioned by engaging an engagement recessed portion 20b formed on a socket engagement portion 20a with a positioning projection formed on the inner peripheral surface of the yoke. Waterproofing is performed by pressing and providing a seal such as an O-ring seal between stepped portions for forming the socket engagement portion 20a and the opening end of the yoke.

In recent years, there has been a strong demand for motors to have higher output and reliability and a longer service life. One example of lengthening the service life of a motor is to lengthen the radial length of the brush as much as possible. However, as described above, in a motor in which a socket engagement method is used, since the inner diameter of the bracket is smaller than that of the yoke, the brush holder must be mounted within the bracket. This obstructs the radial lengthening of the brush. The entire casing must thus be made larger to radially lengthen the bracket, or a specially-shaped bracket must be prepared. The inner portion of the bracket where a brush housing portion is formed is large, and the top end portion of the bracket where the socket engagement portion is formed is small. The former case has a drawback in that the entire motor is enlarged; the latter case has a drawback in that a special bracket must be prepared, increasing costs.

One of the measures for making a motor provide a high output is to use an axially long permanent magnet. However, if a long permanent magnet is used, the end portion of the permanent magnet interferes with the socket engagement portion engaged with the yoke, therefore preventing assembly. To prevent this, an axially long yoke must be used, causing a problem conflicting with the aim of making the motor compact.

SUMMARY OF THE INVENTION

The present invention has been achieved in view of the above-described circumstances.

An object of the present invention is to provide a casing structure of a motor capable of solving the above-mentioned problems of the prior art.

A motor casing is formed in such a way that a bracket, with which a brush holder which slidably contacts a commutator of an armature provided within a cylindrical yoke is provided integrally, is attached to an edge portion of an opening of the cylindrical yoke in the inner peripheral surface on which a permanent magnet is fixed, the motor casing comprising: a bracket assembled to a yoke in such a way that an outer peripheral surface of an edge portion of an opening of the yoke is placed on the inner peripheral surface of a tubular peripheral edge portion of the bracket; an annular recessed groove formed on the outer peripheral surface of the edge portion of the opening of the yoke, on the peripheral surface of which the tubular peripheral edge portion of the bracket is placed, a seal being inserted into the annular recessed groove so that the outer circumference of the seal projects from the outer peripheral surface of the yoke in a normal condition; and a positioning piece, in which a positioning recessed portion in the shape of a sideways U is formed, provided in a projected manner in an extreme end of the tubular peripheral edge portion of the bracket so that a positioning projection provided in the outer peripheral surface of the yoke is engaged with the positioning recessed portion to perform axial positioning of the bracket with respect to the yoke while preventing axial turning of the bracket with respect to the yoke and so that the inner peripheral surface of the positioning piece is made larger than the outer diameter of the seal projecting from the outer peripheral surface of the yoke so that the positioning piece will not interfere with the seal during the placement of the bracket on the yoke.

With the above-described construction, a motor casing of the present invention does not need to be enlarged to a large degree whereas a brush can be made radially long and a permanent magnet can be made axially long.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

The invention will be described with reference to the following figures, wherein.

DESCRIPTION OF THE PREFERRED EMBODIMENT

Figure 1:
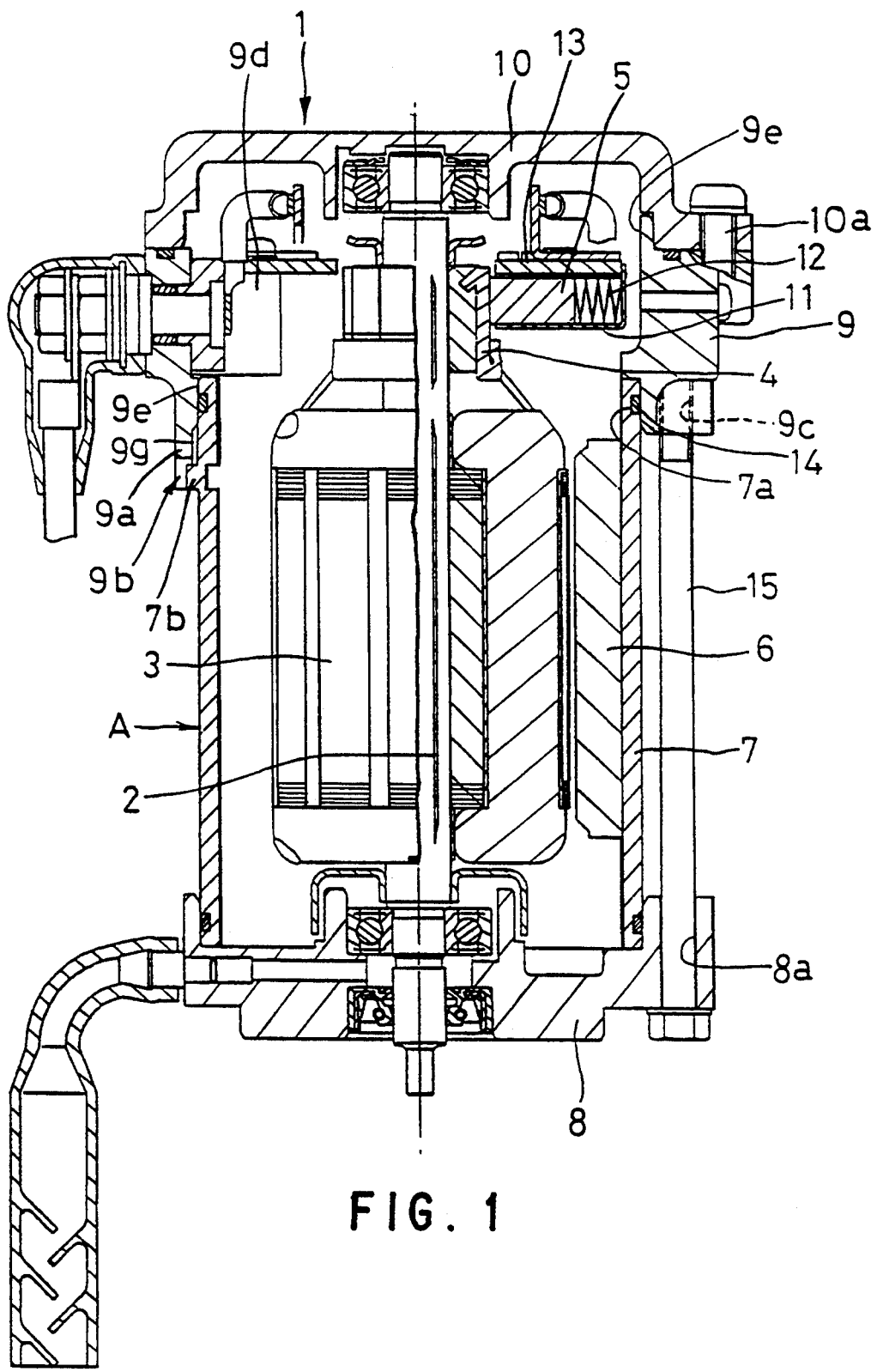
FIG. 1 is a sectional view of a motor.
Figure 2:
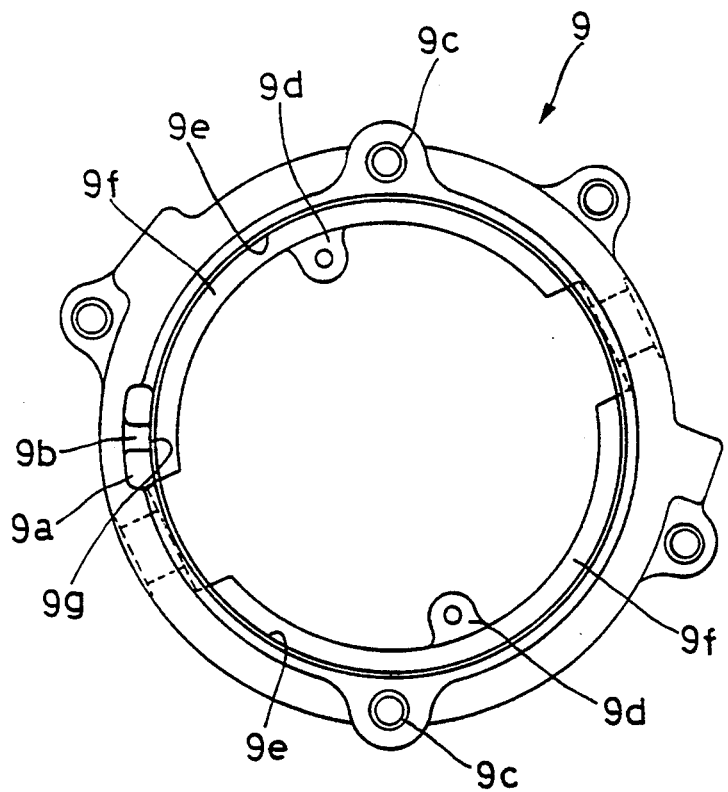
FIG. 2 is a bottom plan view of an intermediate bracket.
Figure 3:
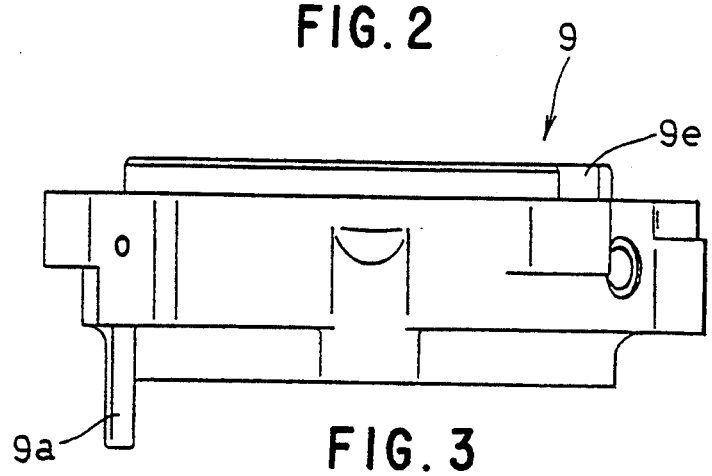
FIG. 3 is a front view of the intermediate bracket.
Figure 4:
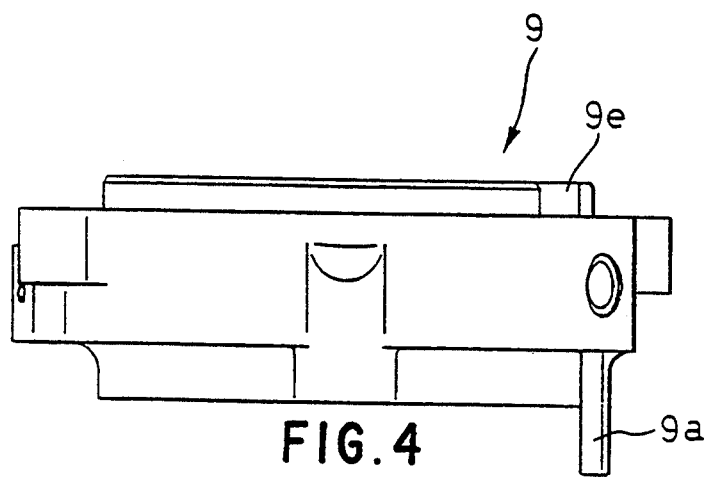
FIG. 4 is a rear view of the intermediate bracket.
Figure 5:
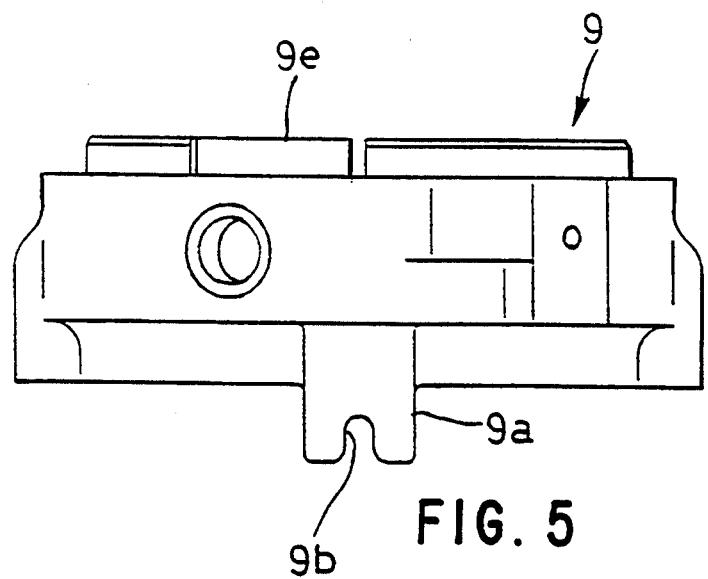
FIG. 5 is a left side view of the intermediate bracket.
Figure 6:
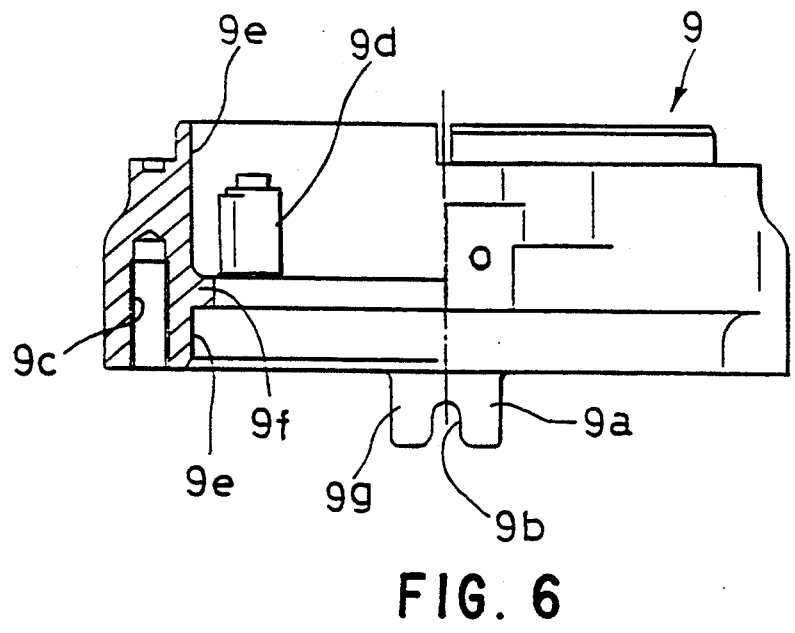
FIG. 6 is a partial right side view of the intermediate bracket.
Figure 7:
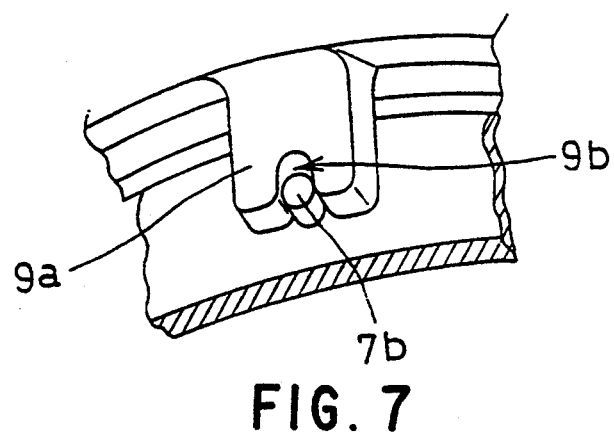
FIG. 7 is a perspective view of a positioning engagement portion.
Figure 8:
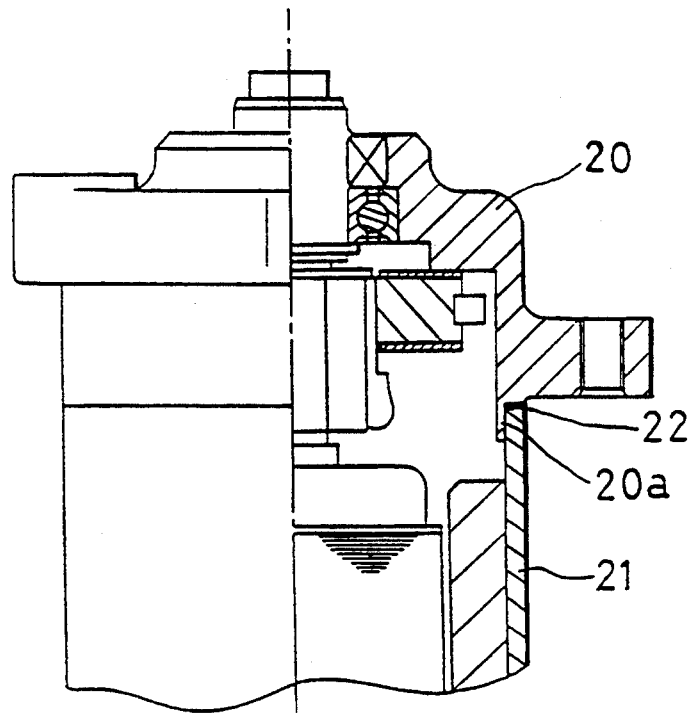
FIG. 8 is a partial sectional view illustrating a conventional motor.
Figure 9:
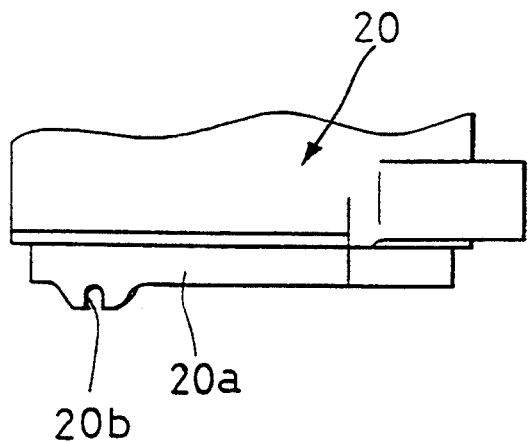
FIG. 9 is a partial right side view of a conventional bracket.

Next, an embodiment of the present invention will be explained below with reference to the accompanying drawings.

In the figures, reference numeral 1 denotes a motor for driving a hydraulic pump. The motor 1 is formed of various types of members, such as a core shaft 2, an armature 3, a commutator 4, a brush 5, and a permanent magnet 6, in the same manner as in the prior art.

Reference letter A denotes a casing of a motor. The casing A is formed of a cylindrical yoke 7 having openings on the upper and lower sides thereof; a lower end bracket 8 which is attached to an edge portion of the lower opening of the yoke 7 and on which a lower end portion of the core shaft 2 is pivoted; a cylindrical intermediate bracket 9; and an upper end bracket 10 which is fixed to an edge portion of the upper opening of the intermediate bracket 9 by way of a bolt 10a and on which an upper end portion of the core shaft 2 is pivoted. That is, the yoke 7 forms the central portion of the casing A, and the permanent magnet 6 is fixed on the inner peripheral surface of the casing A. The armature 3 is disposed in such a manner as to face the permanent magnet 6. The commutator 4 integrally mounted on the core shaft 2 is provided in such a manner as to project upwardly from the edge portion of the upper opening of the yoke 7.

The brush 5 which slidably contacts the commutator 4, a brush holder 11 for radially and slidably housing the brush 5, a spring for constantly energizing the brush 5 toward the commutator 4, and a brush holder stay 13 for supporting and fixing the brush holder 11 are integrally provided in the intermediate bracket 9 as a result of the brush holder stay 13 being fixed to a mounting boss portion 9d of the intermediate bracket 9. The inner diameter of the intermediate bracket 9 is substantially equal to the outer diameter of the yoke 7. An annular projection 9f, a part of which is cut out, which the upper end surface of the yoke 7 abuts, is integrally formed in the lower portion of an inner peripheral surface 9e of the intermediate bracket 9. The attachment of the intermediate bracket 9 to the yoke 7 is performed by placing the outer peripheral surface of the edge portion of the upper opening of the yoke 7 on the inner peripheral surface 9e in the tubular peripheral edge portion of the intermediate bracket 9.

An annular recessed groove 7a is formed on the outer peripheral surface of the end portion of the upper opening of the yoke 7, on the outer peripheral surface of which the tubular peripheral edge portion of the intermediate bracket 9 is placed. A sealing O-ring 14 is inserted into the annular recessed groove 7a. The outer circumference of the O-ring 14 projects from the outer peripheral surface of the yoke 7 in a normal condition. The O-ring 14 is interposed in a pressed manner between the inner peripheral surface 9e of the intermediate bracket 9 and the bottom of the recessed groove 7a on the outer peripheral surface of the yoke 7 as a result of the placement of the intermediate bracket 9 on the yoke 7. Reference numeral 9a denotes a positioning piece provided in the end of the tubular peripheral edge portion of the intermediate bracket 9 in such a manner as to project downward. A positioning recessed portion 9b having an opening in the shape of a sideways U in the lower portion thereof is formed in the positioning piece 9a. The diameter of the inner peripheral surface 9g of the positioning piece 9a is larger than the outer diameter of the O-ring 14 projecting from the outer peripheral surface of the yoke 7 in a normal condition so that the positioning piece 9a does not interfere with the O-ring 14 during the placement of the intermediate bracket 9 onto the yoke 7. A positioning projection 7b is provided at a location below the annular recessed groove 7a. Thus, by engaging the positioning recessed portion 9b with the positioning projection 7b, the intermediate bracket 9 can be attached to the yoke 7 while achieving axial positioning.

Reference numeral 15 denotes a through bolt. The casing A is integrally assembled by screwing and fastening the through bolt 15 to a screw hole 9c formed in the intermediate bracket 9.

When the intermediate bracket 9 is attached to the yoke 7 in the embodiment of the present invention constructed as described above, the outer peripheral surface of the edge portion of the opening of the yoke 7 is placed on the inner peripheral surface 9e in the tubular peripheral edge portion of the intermediate bracket 9, and the inner diameter of the intermediate bracket 9 can be made to have a large diameter substantially equal to the outer diameter of the yoke 7. As a result, a radially long brush can be used as the brush 5 provided within the intermediate bracket 9, greatly contributing to lengthening the service life of the motor. Furthermore, since, unlike the prior art, no socket engagement of the brush is made on the inner peripheral surface of the yoke 7 and since the positioning projection 7b does not project toward the inner periphery of the yoke 7, a long permanent magnet can be used as the permanent magnet 6 fixed onto the inner peripheral surface of the yoke 7. Therefore, a higher output can be achieved without requiring lengthening of the axial length of the yoke 7.

In addition, the intermediate bracket 9 can be attached to the yoke 7 in an axially positioned manner while preventing axial turning of the bracket with respect to the yoke by engaging the positioning recessed portion 9b of the intermediate bracket 9 with the positioning projection 7b of the yoke 7. Furthermore, waterproofing between the intermediate bracket 9 and the yoke 7 is reliably ensured by means of the O-ring 14 interposed in a pressed manner between the inner peripheral surface 9e of the intermediate bracket 9 and the outer peripheral surface of the yoke 7. In such a case, the diameter of the inner peripheral surface 9g of the positioning piece 9a is larger than the outer diameter of the O-ring 14 in a normal condition inserted into the annular recessed groove 7a, and the positioning piece 9a does not interfere with the O-ring 14 during the placement of the intermediate bracket 9 onto the yoke 7. Therefore, the risk that the annular recessed groove 7a will inadvertently contact and damage the O-ring 14 can be reliably prevented during attachment of the intermediate bracket 9.

Accordingly, since the present invention is constructed as described above, the inner diameter of a bracket can be made to have a large diameter substantially equal to the outer diameter of a yoke as the outer peripheral surface of the edge portion of the opening of the yoke is placed on the inner peripheral surface of the tubular peripheral edge portion of the bracket. A bracket longer in the axial direction by an amount corresponding to the above diameter can be used, greatly contributing to longer service life. Furthermore, since, unlike the prior art, no socket engagement of the brush is made on the inner peripheral surface of the yoke, a permanent magnet long enough to reach the opening end of the yoke can be used. Thus, a higher output can be achieved without requiring a long yoke.

In addition, waterproofing between the bracket and the yoke can be satisfactorily ensured by a seal interposed in a pressed manner between the inner peripheral surface of the bracket and the outer peripheral surface of the yoke. In such a case, the inner diameter of the positioning piece provided for axial positioning of the bracket is larger than the outer diameter of the seal inserted into the annular recessed groove. Thus, the positioning piece does not interfere with the seal during the placement of the bracket onto the yoke. Therefore, the risk that the seal will inadvertently interfere with and damage the positioning piece can be reliably prevented, and, thus, high waterproofing can be maintained.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included with the spirit and scope of the claims. The following claim is to be accorded the broadest interpretation, so as to encompass all such modifications and equivalent structures and functions.

What is claimed is:

1. A motor casing wherein a bracket, with which a brush holder which slidably contacts a commutator of an armature provided within a cylindrical yoke is provided integrally, is attached to an edge portion of an opening of the cylindrical yoke in an inner peripheral surface on which a permanent magnet is fixed, said motor casing comprising:
   a yoke;
   a bracket having a tubular peripheral edge portion, said tubular peripheral edge portion having inner and outer peripheral surfaces, said bracket being attached to said yoke such that an outer peripheral surface of an edge portion of an opening of said yoke is placed on the inner peripheral surface of the tubular peripheral edge portion of the bracket;
   an annular recessed groove formed on the outer peripheral surface of the edge portion of the opening of the yoke, the tubular peripheral edge portion of said bracket being placed on the outer peripheral surface of the edge portion of the opening of the yoke, a seal being inserted into the annular recessed groove so that an outer circumference of the seal projects from the outer peripheral surface of the yoke in a normal condition;
   a positioning projection provided in the outer peripheral surface of the yoke; and
   a positioning piece having a positioning recessed portion, said positioning piece projecting from an extreme end of the tubular peripheral edge portion of the bracket, said positioning projection provided in the outer peripheral surface of the yoke being engaged with the positioning recessed portion to perform axial positioning of the bracket with respect to the yoke while preventing axial turning of the bracket with respect to the yoke, an inner peripheral surface of the positioning piece being larger than an outer diameter of the seal projecting from said outer peripheral surface of the yoke so that the positioning piece does not interfere with the seal during placement of the bracket on the yoke.

2. The motor casing according to claim 1, wherein said bracket has an inner diameter substantially equal to an outer diameter of said yoke.

3. The motor casing according to claim 1, wherein said bracket has an annular projection integrally formed in said inner peripheral surface of said bracket, an upper end surface of said yoke abutting said annular projection.

4. The motor casing according to claim 1, wherein said seal is interposed in a pressed manner between said inner peripheral surface of said bracket and said annular recessed groove when said bracket is placed on said yoke.

5. The motor casing according to claim wherein said positioning recessed portion is in the shape of a sideways U.

6. A bracket for use in a motor casing, said bracket comprising:
   a tubular peripheral edge portion having inner and outer peripheral surfaces, said inner peripheral surface for attachment to an outer peripheral surface of a cylindrical yoke;
   a positioning piece having a positioning recessed portion, said positioning piece projecting from an extreme end of said tubular peripheral edge portion, said positioning recessed portion for engagement with a positioning projection on an outer peripheral yoke surface for ensuring proper axial positioning of said bracket with respect to said yoke while preventing axial turning of the bracket with respect to the yoke; and
   an annular projection integrally formed in said inner peripheral surface of said bracket, said annular projection for abutting an upper end surface of said yoke.

7. The bracket according to claim 6, wherein a seal projects from said outer peripheral yoke surface, said positioning piece having an inner peripheral surface which is larger than an outer diameter of said outer peripheral yoke surface such that, when said bracket is attached to said yoke, said positioning piece does not interfere with said seal.

8. The bracket according to claim 6, wherein said bracket has an inner diameter substantially equal to an outer diameter of said yoke.

9. An apparatus for use in a motor casing, comprising:
   a yoke;
   a bracket having a tubular peripheral edge portion said tubular peripheral edge portion having inner and outer peripheral surfaces, said bracket being attached to said yoke such that an outer peripheral surface of an edge portion of an opening of said yoke is placed on the inner peripheral surface of the tubular peripheral edge portion of the bracket;
   an annular recessed groove formed in the outer peripheral surface of the edge portion of the opening of the yoke, the tubular peripheral edge portion of said bracket being placed on the outer peripheral surface of the edge portion of the opening of said yoke;
   a seal positioned in said annular recessed groove, an outer circumference of said seal projecting from the outer peripheral surface of the yoke in a normal condition, said seal being interposed in a pressed manner between said inner peripheral surface of said bracket and said annular recessed groove when said bracket is placed on said yoke;
   a positioning projection provided in the outer peripheral surface of the yoke; and
   a positioning piece having a positioning recessed portion, said positioning piece projecting from an extreme end of the tubular peripheral edge portion of the bracket, said positioning projection provided in the outer peripheral surface of said yoke being engaged with the positioning recessed portion to perform axial positioning of the bracket with respect to said yoke while preventing axial turning of the bracket with respect to said yoke, an inner peripheral surface of said positioning piece being larger than an outer diameter of said seal projecting from the outer peripheral surface of said yoke so that said positioning piece does not interfere with said seal during placement of said bracket on the yoke.

10. The apparatus according to claim 9, wherein said bracket has an inner diameter substantially equal to an outer diameter of said yoke.

11. The apparatus to claim 9, wherein said bracket has an annular projection integrally formed in said inner peripheral surface of said bracket, an upper end surface of said yoke abutting said annular projection.

12. The apparatus according to claim 9, wherein said positioning recessed portion is in the shape of a sideways U.

* * * * *